US012553953B2

(12) United States Patent
Fukutomi et al.

(10) Patent No.: US 12,553,953 B2
(45) Date of Patent: Feb. 17, 2026

(54) STATE DETERMINATION DEVICE FOR FUEL CELL STACK

(71) Applicant: SUBARU CORPORATION, Tokyo (JP)

(72) Inventors: Yushi Fukutomi, Tokyo (JP); Tomohiro Abe, Tokyo (JP); Pei Pei, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 173 days.

(21) Appl. No.: 18/605,716

(22) Filed: Mar. 14, 2024

(65) Prior Publication Data

US 2024/0302442 A1 Sep. 12, 2024

Related U.S. Application Data

(63) Continuation of application No. PCT/JP2022/039060, filed on Oct. 20, 2022.

(51) Int. Cl.
*G01R 31/385* (2019.01)
*G01R 31/3835* (2019.01)
*G01R 31/389* (2019.01)
*G01R 31/392* (2019.01)

(52) U.S. Cl.
CPC ....... *G01R 31/386* (2019.01); *G01R 31/3835* (2019.01); *G01R 31/389* (2019.01); *G01R 31/392* (2019.01)

(58) Field of Classification Search
None
See application file for complete search history.

(56) References Cited

U.S. PATENT DOCUMENTS

2004/0091759 A1* 5/2004 Harrington .......... G01R 31/389
714/48
2009/0117427 A1 5/2009 Manabe et al.
2017/0307692 A1 10/2017 Aoki

FOREIGN PATENT DOCUMENTS

JP 2001-277056 A 10/2001
JP 2002-367650 A 12/2002
JP 2007-012418 A 1/2007
(Continued)

OTHER PUBLICATIONS

International Search Report received in PCT Application No. PCT/JP2022/039060, dated Dec. 6, 2022.

*Primary Examiner* — Jas A Sanghera
(74) *Attorney, Agent, or Firm* — Rimon P.C.

(57) ABSTRACT

A state determination device for a fuel cell stack includes: a fuel cell stack including at least one cell; and a control device that performs a state determination of the fuel cell stack by applying a measurement load waveform to the cell. The control device: generates a learning waveform; generates a measurement load waveform to be used this time by using, as reference values, membrane resistance, charge transfer resistance, and diffusion resistance in a relationship between a measurement frequency and an impedance that are generated based on the learning waveform; applies, to the cell, a waveform with an amplitude and frequencies that are calculated based on the measurement load waveform; and performs the state determination by measuring an alternating-current impedance by discharging, from the cell, a current or a voltage corresponding to a frequency of the measurement load waveform.

5 Claims, 12 Drawing Sheets

(56) References Cited

FOREIGN PATENT DOCUMENTS

| | | |
|---|---|---|
| JP | 2007-250365 A | 9/2007 |
| JP | 2008-282664 A | 11/2008 |
| JP | 2010008146 A | 1/2010 |
| JP | 2011-192419 A | 9/2011 |
| JP | 2012-078339 A | 4/2012 |
| WO | 2016/067430 A1 | 5/2016 |

* cited by examiner

|  |  | MEMBRANE RESISTANCE $R_{mem}$ | |
|---|---|---|---|
|  |  | INCREASE | DECREASE |
| DIFFUSION RESISTANCE $R_{dif}$ | INCREASE | DRY TENDENCY (WET TREATMENT) | WET TENDENCY (DRY TREATMENT) |
|  | DECREASE | WET TENDENCY (DRY TREATMENT) | DRY TENDENCY (WET TREATMENT) |

FIG. 15

STATE DETERMINATION DEVICE FOR FUEL CELL STACK

CROSS REFERENCE TO RELATED APPLICATIONS

This application is a continuation of International Application No. PCT/JP2022/039060, filed on Oct. 20, 2022, the entire contents of which are hereby incorporated by reference.

BACKGROUND

Technical Field

The present disclosure relates to, for example, a state determination device for a fuel cell stack.

Related Art

In modern society, transportation is indispensable, and various vehicles such as automobiles move on the road in daily life. Among them, fuel cells have attracted attention as a new driving source that supplies a drive force to a vehicle because the fuel cells have a relatively light load on the environment.

In such a fuel cell, one electrode (anode) is supplied with a fuel gas (hydrogen), the other electrode (cathode) is supplied with an oxidant gas (oxygen), and these chemically react to give electric energy. Therefore, in order to continuously obtain appropriate electric energy (generated power) from the fuel cell, deterioration of the fuel cell mounted on the vehicle is to be appropriately determined.

For example, in WO2016/067430, an activation overvoltage is obtained based on an amount of electricity generated at the time of reduction of a catalyst in each cell constituting a fuel cell, and an FC voltage is estimated from the obtained activation overvoltage. In this case, WO2016/067430 proposes comparing the estimated FC voltage with an actual FC voltage detected by a voltage sensor and determining deterioration of the fuel cell based on the comparison result.

For example, Japanese Unexamined Patent Application Publication No. 2007-012418 focuses on water content in a fuel cell as a criterion for deterioration determination. It proposes estimating the water content by obtaining proton transfer resistance and gas reaction resistance using a Cole-Cole plot. The Cole-Cole plot is a characteristic diagram illustrating the relationship between the frequency and the impedance on a complex plane.

SUMMARY

An aspect of the disclosure provides a state determination device for a fuel cell stack. The state determination device includes a fuel cell stack including one or more cells, and a control device configured to perform a state determination of the fuel cell stack by applying a measurement load waveform to the one or more cells. The control device is configured to generate a learning waveform by referring to a result of measurement by applying a primary processing learning waveform to the one or more cells and a result of measurement by applying a secondary processing learning waveform to the one or more cells. The primary processing learning waveform includes frequencies with different numbers of digits and is configured to primarily grasp membrane resistance of the one or more cells. The secondary processing learning waveform includes frequencies generated by increasing a number of frequencies used for the measurement with the primary processing learning waveform and configured to secondarily grasp the membrane resistance. The control device is configured to generate the measurement load waveform to be used this time by using, as reference values, the membrane resistance, charge transfer resistance, and diffusion resistance in a relationship between a measurement frequency and an impedance that are generated based on the learning waveform. The control device is configured to apply, to the one or more cells, a waveform with an amplitude and frequencies that are calculated based on the measurement load waveform. The control device is configured to perform the state determination by measuring an alternating-current impedance by discharging, from the one or more cells, a current or a voltage corresponding to a frequency of the measurement load waveform.

An aspect of the disclosure provides a state determination device for a fuel cell stack. The state determination device includes a fuel cell stack including one or more cells, and circuitry configured to perform a state determination of the fuel cell stack by applying a measurement load waveform to the one or more cells. The circuitry is configured to generate a learning waveform by referring to a result of measurement by applying a primary processing learning waveform to the one or more cells and a result of measurement by applying a secondary processing learning waveform to the one or more cells. The primary processing learning waveform includes frequencies with different numbers of digits and is configured to primarily grasp membrane resistance of the one or more cells. The secondary processing learning waveform includes frequencies generated by increasing a number of frequencies used for the measurement with the primary processing learning waveform and configured to secondarily grasp the membrane resistance. The circuitry is configured to generate the measurement load waveform to be used this time by using, as reference values, the membrane resistance, charge transfer resistance, and diffusion resistance in a relationship between a measurement frequency and an impedance that are generated based on the learning waveform. The circuitry is configured to apply, to the one or more cells, a waveform with an amplitude and frequencies that are calculated based on the measurement load waveform. The control device is configured to perform the state determination by measuring an alternating-current impedance by discharging, from the one or more cells, a current or a voltage corresponding to a frequency of the measurement load waveform.

BRIEF DESCRIPTION OF THE DRAWINGS

FIG. 15 is a schematic diagram illustrating reference table data (an example) used in a water content adjustment step in a management method for a fuel cell.

DETAILED DESCRIPTION

Not limited to WO2016/067430, JP-A 2007-012418, JP-A 2012-078339, JP-A 2007-250365, and JP-A 2001-277056, the current technology has not yet satisfied the market needs and has the following problems.

Methods for estimating an internal state of a fuel cell during driving typically include an alternating-current impedance method described in WO2016/067430, JP-A 2007-012418, JP-A 2012-078339, JP-A 2007-250365, and JP-A 2001-277056. This alternating-current impedance method uses a frequency response analyzer (FRA), usually uses a single frequency as a measurement waveform, and takes time for measurement in analysis of frequencies. As another method, an impedance spectrum is obtained in a short time by a fast Fourier transform (FFT) method with a waveform in which frequencies are superimposed. However, an error due to noise occurs, and thus noise countermeasures and waveform processing are used, resulting in a large-scale device.

In order to perform highly accurate measurement in a short time as described above, it is preferable to use a waveform in which frequencies are superimposed. However, for example, in order to simply execute the FFT method in a vehicle such as a fuel cell vehicle, the device scale is increased, which is not feasible from the viewpoint of cost.

It is desirable to provide a state determination device for a fuel cell that can reduce an arithmetic load and accurately measure an internal state of a fuel cell in a short time.

Subsequently, a preferred embodiment of the present disclosure will be described. In the present description and the drawings, components including substantially the same functional configurations are denoted by the same reference signs, and redundant description is omitted. For configurations other than those described in detail below, for example, in addition to known alternating-current impedance methods, the impedance measurement methods disclosed in WO2016/067430, JP-A 2007-012418, JP-A 2012-078339, JP-A 2007-250365, and JP-A 2001-277056, and element technologies and configurations related to known fuel cell systems and fuel cell vehicles may be appropriately complemented.

Fuel Cell Vehicle FCV

Figure 1:
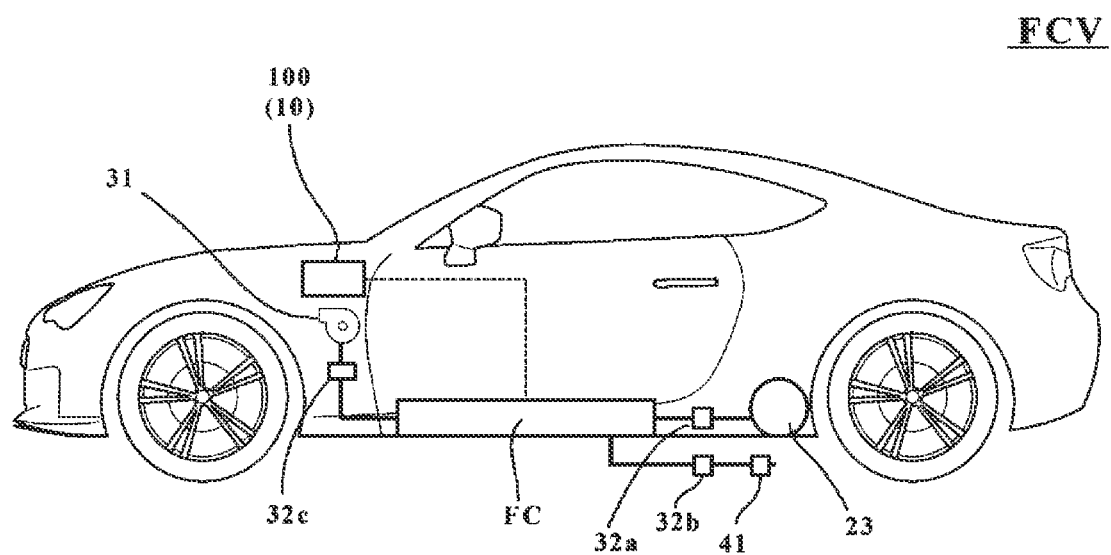
FIG. 1 is a schematic diagram illustrating a configuration example of a fuel cell vehicle including a state determination device for a fuel cell according to an embodiment.
Figure 2:
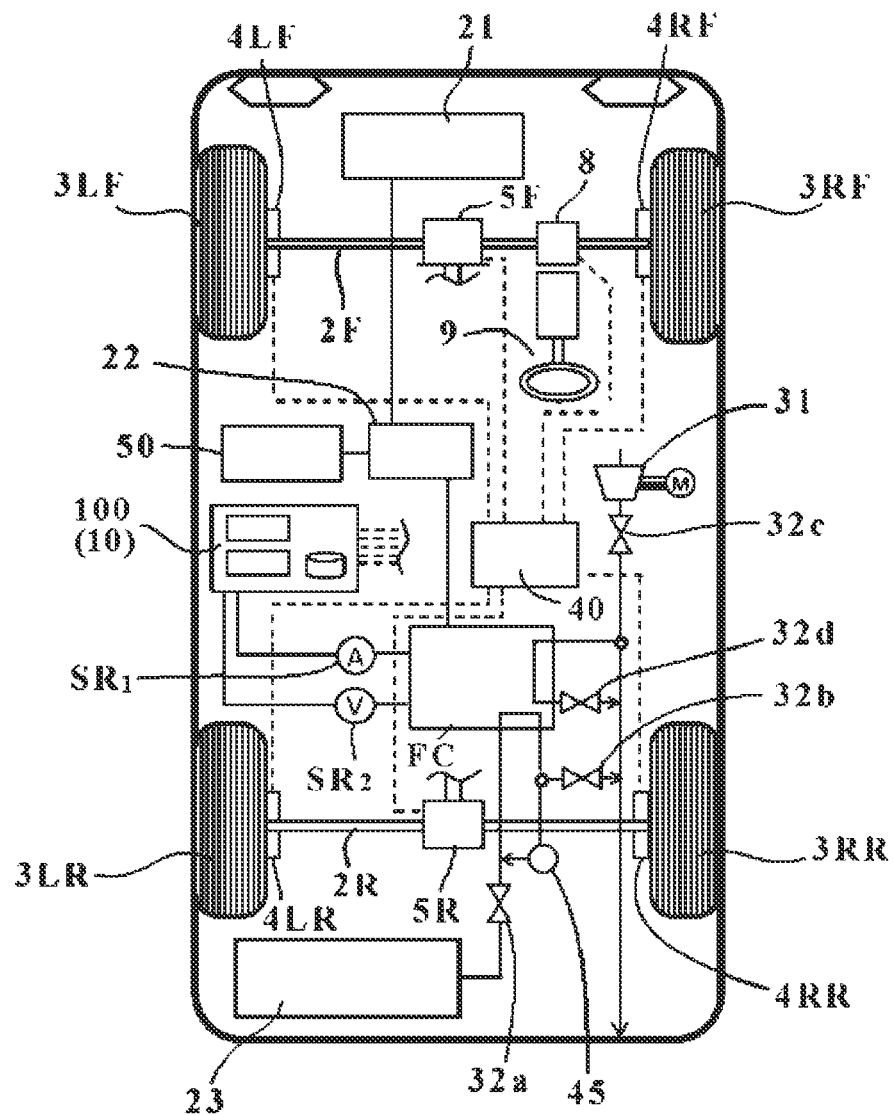
FIG. 2 is a schematic diagram illustrating each configuration and function of a fuel cell vehicle according to an embodiment.

FIGS. 1 and 2 are schematic diagrams illustrating a configuration example and functional blocks, respectively, of a fuel cell vehicle FCV including a fuel cell stack FC according to the present embodiment. As illustrated in FIG. 2, this fuel cell vehicle FCV is a four-wheel drive vehicle that transmits driving torque output from a driving power source 21 that generates driving torque of the vehicle to a left front wheel 3LF, a right front wheel 3RF, a left rear wheel 3LR, and a right rear wheel 3RR (hereinafter, when a particular distinction is not required, they are collectively referred to as "wheels 3"). The driving power source 21 can be a known electric motor disposed on the front wheel side in the present embodiment.

One electric motor as the driving power source 21 of the present embodiment may be disposed on each of the front wheel side and the rear wheel side, or one electric motor may be disposed on each of the wheels 3. In addition to the electric motor, the driving power source 21 may further include an internal combustion engine such as a gasoline engine, a diesel engine, or a gas turbine engine.

A power supply system that supplies desired electric power to such a driving power source 21 includes a fuel cell stack FC, a hydrogen gas supply, an air supply, a secondary battery 50, a converter 22, and a control device 100. The fuel cell stack FC includes a stack of known fuel cells (hereinafter, also simply referred to as "cell") such as polymer electrolyte fuel cells (PEFC). The hydrogen gas supply includes a known hydrogen tank 23 and a known pipe. The air supply includes a known compressor 31 and a known pipe. The secondary battery 50 is known and is, for example, a lithium ion secondary battery or a lead storage battery. The converter 22 is known. The control device 100 controls them. The control device 100 according to the present embodiment also serves as a state determination device 10 that determines deterioration of the fuel cell stack FC. In this power supply system, each of the fuel cell stack FC and the secondary battery 50 can supply power to a load including the electric motor.

As illustrated in FIG. 2, this fuel cell stack FC is coupled to a load including the converter 22 and the driving power source 21 (electric motor). As illustrated in FIG. 2, the current and the voltage in the fuel cell stack FC are detected by a current sensor SR1 that is known and a voltage sensor SR2 that is known, respectively.

The converter 22 includes a known AC/DC converter that performs conversion between a direct-current and an alternating-current, and a known DC/DC converter that adjusts a voltage of a direct-current to a desired voltage. As an example, the converter 22 of the present embodiment includes a function of, upon receiving a control signal of the control device 100, setting an output voltage generated and output by the fuel cell stack FC, and a function of boosting the power generated by the fuel cell stack FC to a desired voltage when being supplied to a load.

The fuel cell vehicle FCV of the present embodiment includes, as equipment used for drive control, the driving power source 21, an electric steering device 8, and brake devices 4LF, 4RF, 4LR, and 4RR (hereinafter, when a particular distinction is not required, they are collectively referred to as "brake devices 4").

The driving power source 21 outputs driving torque transmitted to a front wheel drive shaft 2F and a rear wheel drive shaft 2R via a transmission not illustrated, a front wheel differential mechanism 5F, and a rear wheel differential mechanism 5R. Drive of the driving power source 21 and the transmission is controlled by a known control device including one or more electronic control units (ECUs).

The front wheel drive shaft 2F is provided with the electric steering device 8. The electric steering device 8 includes an electric motor and a gear mechanism not illustrated and adjusts steering angles of the left front wheel 3LF and the right front wheel 3RF by being controlled by a vehicle drive control device 20 described below.

The vehicle drive control device 20 includes the driving power source 21 that outputs driving torque of the fuel cell vehicle FCV, the electric steering device 8 that controls a steering angle of a steering wheel 9 or another steering wheel, and one or more known electronic control devices (ECU) that control drive of the brake devices 4 that control brake force of the fuel cell vehicle FCV. The vehicle drive control device 20 may include a function of controlling drive of a transmission that shifts an output having been output from the driving power source 21 and transmits the output to the wheels 3.

The hydrogen gas supply is for supplying the fuel (hydrogen) gas to the fuel cell stack FC. As illustrated in FIG. 2, in the hydrogen gas supply, the hydrogen gas stored in the hydrogen tank 23 is supplied to an anode side flow path of the fuel cell stack FC described above through a hydrogen intake valve 32a having a known structure installed in a hydrogen supply flow path.

A part of the hydrogen gas discharged from the fuel cell stack FC may be returned to the hydrogen supply flow path by a circulation flow path and a known circulation pump 45. The remainder of the hydrogen gas discharged from the fuel cell stack FC is diluted by a diluent 41 at a predetermined timing through an opening/closing operation of a known hydrogen exhaust valve 32b under the control of the control device 100. After that, the remainder of the hydrogen gas is emitted (exhausted) to the atmosphere under the control of the control device 100.

The air supply is for supplying oxygen gas (air) to the fuel cell stack FC. As illustrated in FIG. 2, the air supply includes, in addition to the compressor 31, a known oxygen intake valve 32c and an air discharge valve (back pressure valve) 32d for adjusting the amount of oxygen (air) supplied to the cell. This air supply may further include a known flow rate sensor (not illustrated) that can measure a flow rate of the air supplied to the fuel cell stack FC.

Then, the air taken in by the compressor 31 is supplied to a cathode side flow path in the fuel cell stack FC via the oxygen intake valve 32c and a known humidifier (not illustrated). The air supplied to the cell is supplied to the diluent 41 as a cathode off gas under the control of the air discharge valve (back pressure valve) 32d by the control device 100.

The control device 100 includes one or more processors (central processing units (CPUs)) and one or more memories communicably coupled to the one or more processors. The control device 100 may be configured to be connectable to a known external network NET such as the Internet via various known communication devices CD such as a form using a smartphone as an example.

The control device 100 is electrically coupled with the compressor 31, the valves 32 (the hydrogen intake valve 32a, the hydrogen exhaust valve 32b, the oxygen intake valve 32c, and the air discharge valve (back pressure valve) 32d), and the known sensors SR such as the current sensor SR1, and the voltage sensor SR2. They are coupled with the control device 100 directly or via communications such as a controller area network (CAN) or a local interconnect network (LIN).

The fuel cell stack FC of the present embodiment has, for example, a stack structure in which known cells each having an electromotive force of about 1 V are coupled in series and stacked. An example of the fuel cell stack FC of the present embodiment is a polymer electrolyte fuel cell (PEFC). The PEFC has a structure in which cells are coupled in series in a pair of known end plates that hold the fuel cells while pressurizing them at both ends so as to have a system voltage to be used by the fuel cell vehicle FCV.

The individual cells constituting the fuel cell stack FC has a structure in which a known membrane electrode assembly (MEA) is interposed between a pair of known separators installed on an anode side and a cathode side. This MEA includes at least a known cathode catalyst layer, a known anode catalyst layer disposed opposite to this cathode catalyst layer, and a known polyelectrolyte membrane disposed between the cathode catalyst layer and the anode catalyst layer. The membrane electrode assembly may further include a known cathode side gas diffusion layer and a known anode side gas diffusion layer.

State Determination Device 10

Figure 3:
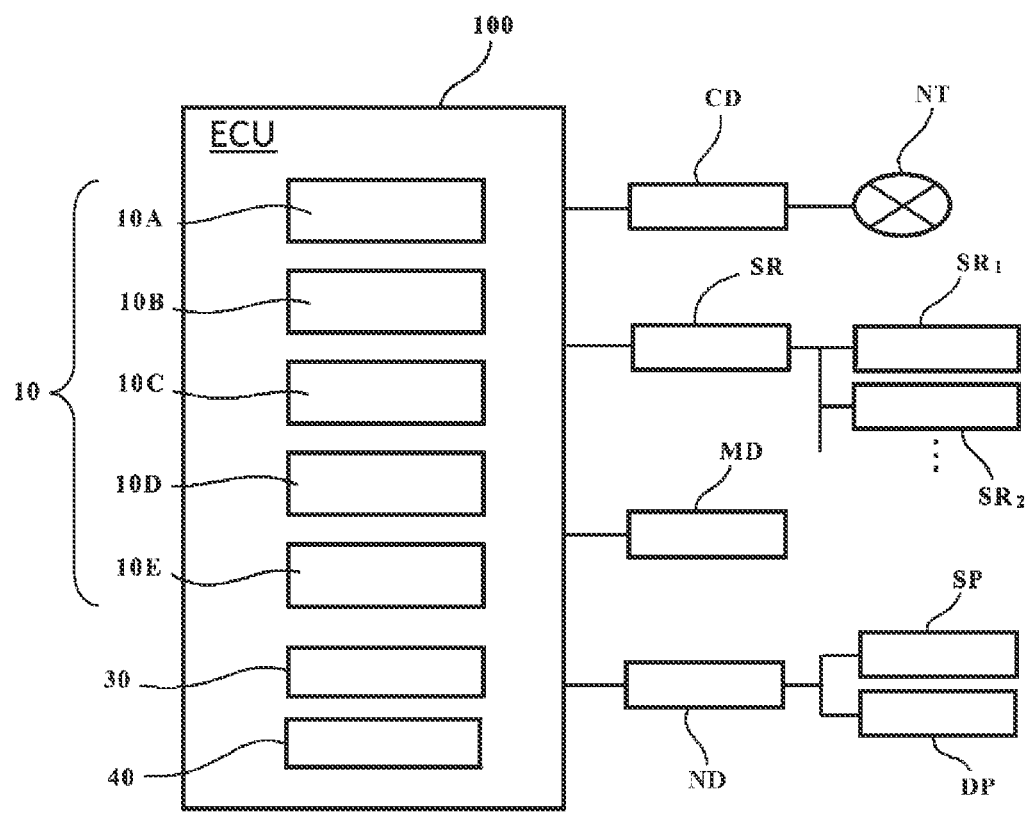
FIG. 3 is a schematic diagram illustrating a configuration example around a control device that also serves as a state determination device according to an embodiment.
Figure 4:
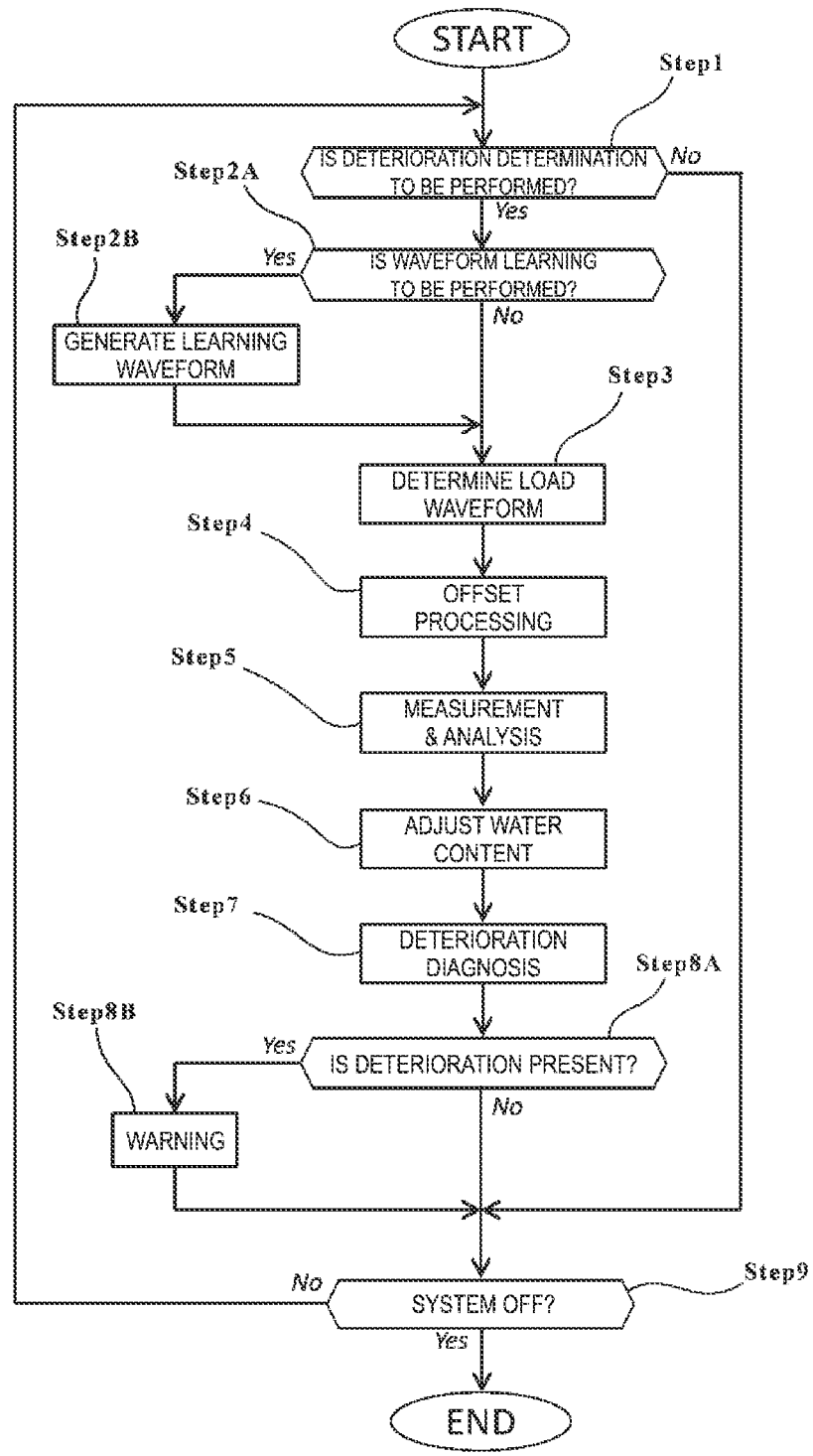
FIG. 4 is a flowchart illustrating a management method including state determination of a fuel cell according to an embodiment.

Subsequently, the state determination device 10 that performs state determination of the fuel cell stack FC in the present embodiment will be described with reference to FIG. 3. The state determination device 10 of the present embodiment is configured to include a function of applying a measurement load waveform to the cells constituting the fuel cell stack FC to perform the state determination of the fuel cell stack.

The state determination device 10 includes a load waveform generator 10A, a current measurer 10B, a voltage measurer 10C, an impedance measurer 10D, and a determiner 10E. As described above, the state determination device 10 is configured as one function executed by the control device 100 of the present embodiment. As illustrated in FIG. 3, the control device 100 may include a drive controller 30 and a presentation controller 40.

The load waveform generator 10A includes a function of generating a learning waveform to be compared with the measurement load waveform. The reference values for this includes the membrane resistance $R_{mem}$, charge transfer resistance $R_{ct}$, and diffusion resistance $R_{dif}$ in the relationship between the measurement frequency and the impedance generated based on a measured load waveform used last time or the learning waveform. Furthermore, the load waveform generator 10A of the present embodiment includes a function of generating a measurement load waveform in which frequencies having amplitudes and frequencies are superimposed based on the above-described learning waveform.

The current measurer 10B is configured to include a function of measuring a current value of the fuel cell stack FC. In one example, the current measurer 10B of the present embodiment can measure the value of the current flowing through the fuel cell stack FC via the current sensor SR1.

The voltage measurer 10C is configured to include a function of measuring a voltage value of the fuel cell stack FC. In one example, the voltage measurer 10C of the present embodiment can measure a value of the voltage applied to the fuel cell stack FC via the voltage sensor SR2.

The impedance measurer 10D is configured to include a function of applying an alternating-current signal for measurement to the fuel cell stack FC to measure the alternating-current impedance of the fuel cell stack FC. The impedance measurer 10D can measure the impedance of the fuel cell stack FC by the alternating-current impedance method based on, for example, the current value and the voltage value measured by applying the current based on the measurement load waveform generated by the load waveform generator 10A.

The determiner 10E includes a function of determining a state of cells constituting the fuel cell stack FC based on the measured alternating-current impedance characteristic. In one example, the determiner 10E of the present embodiment measures the alternating-current impedance by discharging, from the cell, a current or a voltage corresponding to the frequency of the measurement load waveform and performs state determination.

Examples of the state determination that can be executed by the determiner 10E include determination of a water content state as to whether the water content is appropriate in the fuel cell stack.

The determiner 10E of the present embodiment can perform determination of a water content state of the fuel cell stack by calculating the difference (change) between the measurement of last time and the measurement of this time. This is performed using the membrane resistance $R_{mem}$, the charge transfer resistance $R_{ct}$, and the diffusion resistance $R_{dif}$ of the cell. This is based on, for example, a Nyquist diagram (Cole-Cole plot) obtained from the alternating-current impedance. As described later, the determiner 10E does not necessarily calculate the Cole-Cole plot. It may use, as reference values, the membrane resistance $R_{mem}$, charge transfer resistance $R_{ct}$, and diffusion resistance $R_{dif}$ in the relationship between the measurement frequency and the impedance generated based on the measured load waveform.

Examples of the state determination that can be executed by the determiner 10E include deterioration determination as to whether the fuel cell stack has deteriorated. As described later, the determiner 10E of the present embodiment may determine that the fuel cell stack FC is deteriorated when the voltage becomes equal to or less than a threshold even after water management optimization processing. This water management optimization processing is executed based on the determination of the water content state.

The drive controller 30 is configured to include a function of controlling drive of the fuel cell stack FC. In one example, when the determiner 10E determines that deterioration has occurred in the fuel cell stack FC, the drive controller 30 may execute control according to this deterioration. In one example, the drive controller 30 of the present embodiment can execute processing according to a deterioration level of the fuel cell stack FC based on the degree of voltage drop with reference to the threshold.

As an example, the drive controller 30 can execute processing (such as drive control of the fuel cell vehicle FCV) according to a level of, for example, three levels into which the degree of deterioration is divided. For example, in a case of the level 3 where the deterioration degree (the degree of voltage drop with reference to the threshold) is large, the drive controller 30 may restrict output from the fuel cell stack FC or may perform guide processing for quickly performing maintenance to a user such as a driver who drives the fuel cell vehicle FCV via a presentation device DD.

For example, in a case of the level 2 where the deterioration level is the medium level, the drive controller 30 may immediately execute, through the presentation device DD, warning processing that deterioration of the fuel cell stack FC occurs. For example, in a case of the level 1 where the deterioration level is relatively low, the drive controller 30 may execute a reminder that, for example, deterioration of the fuel cell stack FC is progressing through the presentation device DD after the use of the fuel cell vehicle FCV such as when the system is stopped.

The presentation controller 40 executes processing of presenting various kinds of information such as a deterioration state of the fuel cell stack FC and the reminder via the presentation device DD including a known in-vehicle speaker SP and a display DP. The presentation controller 40 may present the various kinds of information to an occupant via the in-vehicle presentation device DD or may perform control of accessing and presenting the various kinds of information to an external terminal such as a smartphone possessed by the occupant.

Management Method for Fuel Cell Stack

Subsequently, with reference also to FIGS. 4 to 12, a management method for the fuel cell stack that can be executed by the control device 100 including the state determination device 10 according to the present embodiment will be described. The management method may be used as an algorithm of a computer-readable program. The program including such an algorithm can be distributed in a downloadable manner to the fuel cell vehicle FCV via, for example, a known network or can be distributed in a form of being stored in a recording medium.

Hereinafter, for example, the user activates the system of the fuel cell vehicle FCV and starts traveling.

First, in Step 1, the control device 100 determines whether deterioration determination of the fuel cell stack FC is to be performed. As the timing to start such deterioration determination, for example, the control device 100 may use, as a reference, whether the fuel cell stack FC reaches an appropriate temperature based on a known temperature sensor (not illustrated). The control device 100 may use, as a reference, for example, a case where the temperature of the fuel cell stack FC becomes appropriate and the load applied to the fuel cell stack FC is relatively light such as when the fuel cell vehicle FCV travels at a constant speed.

When the deterioration determination of the fuel cell stack FC is to be performed in Step 1, the control device 100 determines in subsequent Step 2A whether waveform learning is to be performed regarding the measurement load waveform to be applied to the cells constituting the fuel cell stack FC. For example, when the system of the fuel cell vehicle FCV is activated and the fuel cell stack FC is activated for the first time, a reference value in the period in which the fuel cell stack FC is activated this time is not yet held. Therefore, the control device 100 determines that the waveform learning is to be performed and proceeds to Step 2B. Even in a case where the reference value is already held, the control device 100 may determine that the waveform learning is to be performed in Step 2A in a case where condition under which the learning is performed is satisfied. The condition includes a case where a certain time has elapsed from the time point at which this reference value is acquired or a case where the charge transfer resistance $R_{ct}$ and the diffusion resistance $R_{dif}$ are not calculated in Step 5. On the other hand, in a case where the reference value is held in the period of the activation this time and the condition under which the learning is performed is not satisfied, the control device 100 determines that the waveform learning is not to be performed and proceeds to Step 3.

Learning Waveform Generation Processing

Subsequently, learning waveform generation processing in Step 2B will be described.

Figure 5:
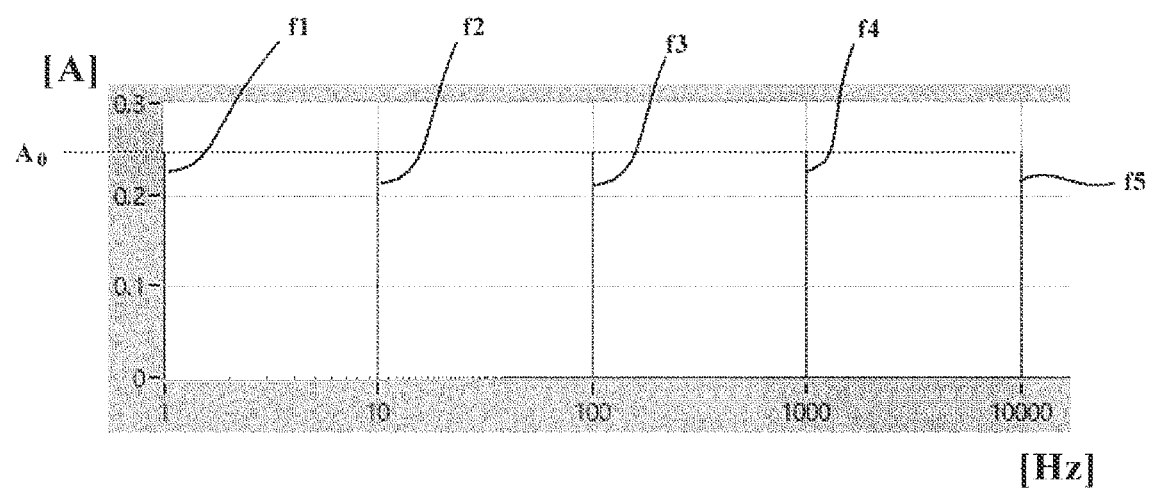
FIG. 5 is a schematic diagram illustrating an example of a primary processing learning waveform calculated in a management method for a fuel cell.

As described above, since the reference value in the period of the activate this time is not yet held at the time of initial activation or the like, the water content state or the like of the fuel cell stack FC is unknown. As the primary processing (measurement frequency search step), the control device 100 measures the impedance of the cells constituting the fuel cell stack FC using a first learning waveform (referred to as a primary processing learning waveform) including frequencies roughly selected. As an example, as illustrated in FIG. 5, the control device 100 measures the impedance by superimposing, on a direct-current loaded on the cells, the primary processing learning waveform including five frequencies f1 to f5 with different numbers of digits. As an example, in the present embodiment, the frequency f1 is set to 1 Hz, the frequency f2 is set to 10 Hz, the frequency f3 is set to 100 Hz, the frequency f4 is set to 1 kHz, and the frequency f5 is set to 10 KHz. However, these frequencies constituting the primary processing learning waveform may have optimum numerical values or the number of frequencies through experiment or simulation.

As illustrated in FIG. 5, the maximum amplitude of the current in the primary processing learning waveform can be set in advance. As an example, in the present embodiment, the maximum amplitude of the current value at each frequency of the primary processing learning waveform is set to 0.25 A. The maximum amplitude of the current value described above may be determined through experiment or simulation, and for example, any value between 0.01 A and 0.3 A is preferable.

Then, the control device 100 executes impedance measurement by applying the primary processing learning waveform to the cell. The control device 100 calculates, from the measurement value obtained based on this primary processing learning waveform, an impedance-frequency graph (first graph) and a phase difference-frequency graph (second graph). The first graph indicates a relationship between the impedance and the frequency (however, accuracy is rougher than a third graph described below) illustrated in FIG. 6. The second graph indicates a relationship between the phase difference between the current and the voltage and the frequency (however, accuracy is rougher than a fourth graph described below) illustrated in FIG. 7.

The reason of this primary processing in the present embodiment is to roughly grasp the value of the membrane resistance $R_{mem}$ to be calculated in secondary processing described below. The value of the membrane resistance exists generally in a range of 3 kHz to 7 kHz in a typical cell. However, an abnormal cell in which the value of the membrane resistance does not exist in the range due to some factor such as deterioration or an external environment can be assumed. Therefore, in the present embodiment, the primary processing includes reducing the arithmetic load at a relatively small number of frequencies and promptly calculating as to whether the cell to be subjected to the deterioration determination is the abnormal cell. In other words, it is whether the value of the membrane resistance exists in the range of 3 kHz to 7 kHz that can be usually assumed.

Figure 6:
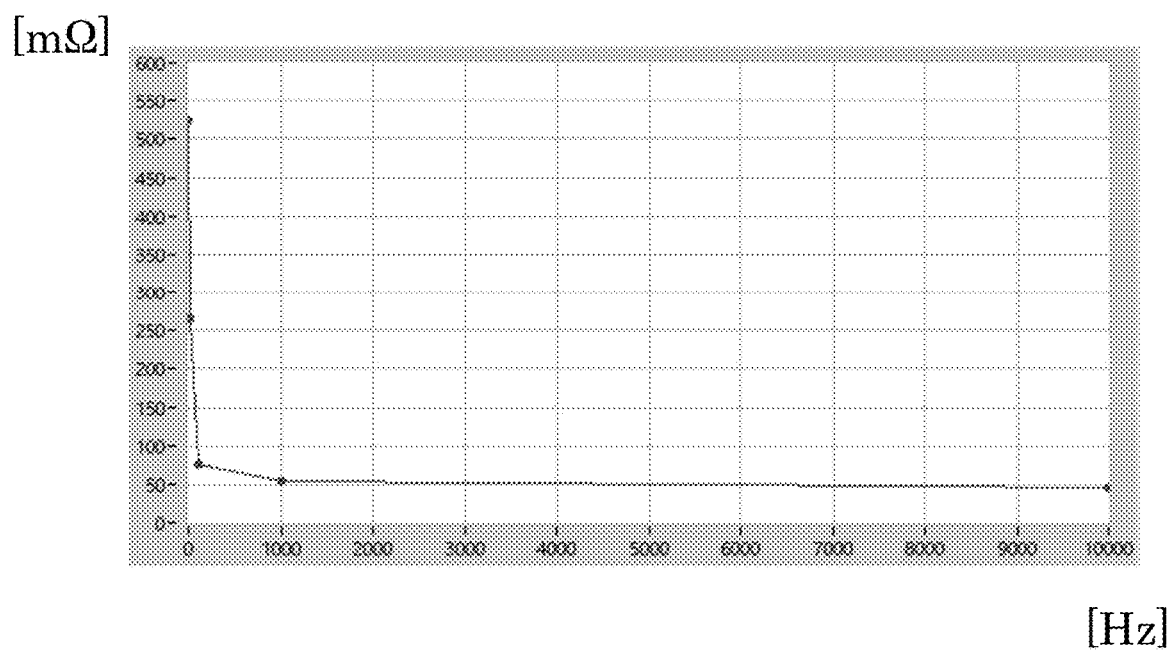
FIG. 6 is an example of a first graph illustrating a relationship between a frequency and an impedance used to acquire an initial value of membrane resistance $R_{mem}$ in a management method for a fuel cell.
Figure 7:
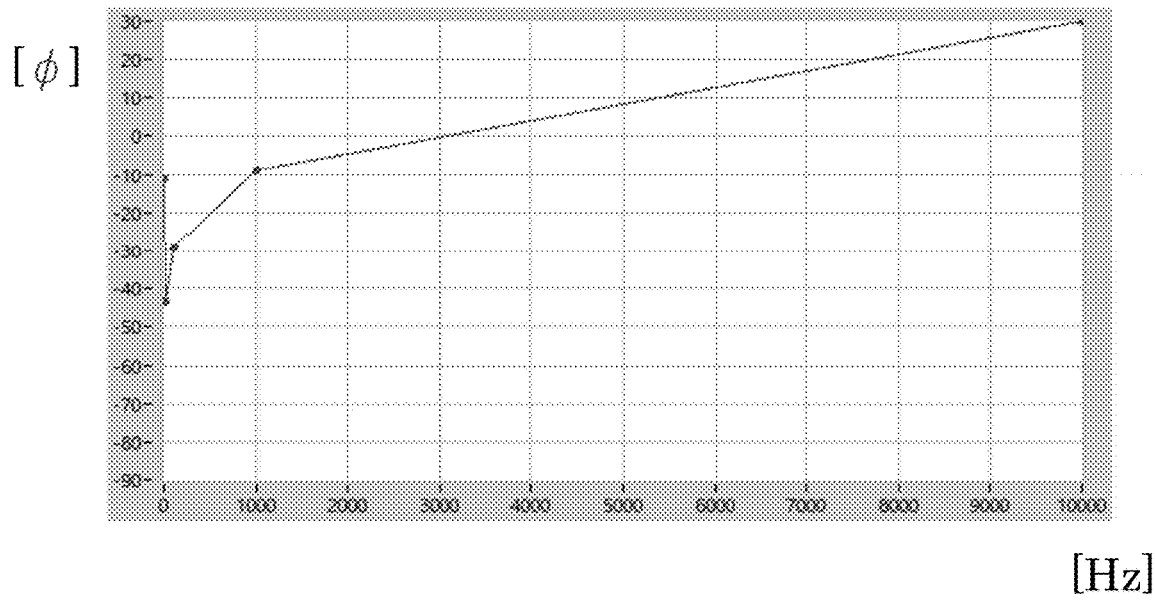
FIG. 7 is an example of a second graph defining a relationship between a phase difference and a frequency used in a measurement frequency search step in a management method for a fuel cell.

Then, in the example of the first graph in FIG. 6, appearance of the minimum value in a region exceeding approximately 3 kHz can be estimated. Also from the second graph in FIG. 7, appearance of a zero cross point in a region exceeding approximately 3 kHz can be assumed. Therefore, the control device 100 can execute processing of determining that the cell to be measured this time is not an abnormal cell and proceeding to the secondary processing.

After the primary processing in the learning waveform generation processing, the control device 100 performs the secondary processing (initial $R_{mem}$ acquisition step). The secondary processing is of generating a secondary processing learning waveform by using the frequencies (f1 to f5) used in the primary processing learning waveform as reference frequencies and increasing the number of frequencies from the respective reference frequencies. In this case, the control device 100 may increase the number of frequencies used for measurement by equally dividing respective reference frequencies within the measurement time.

Figure 8:
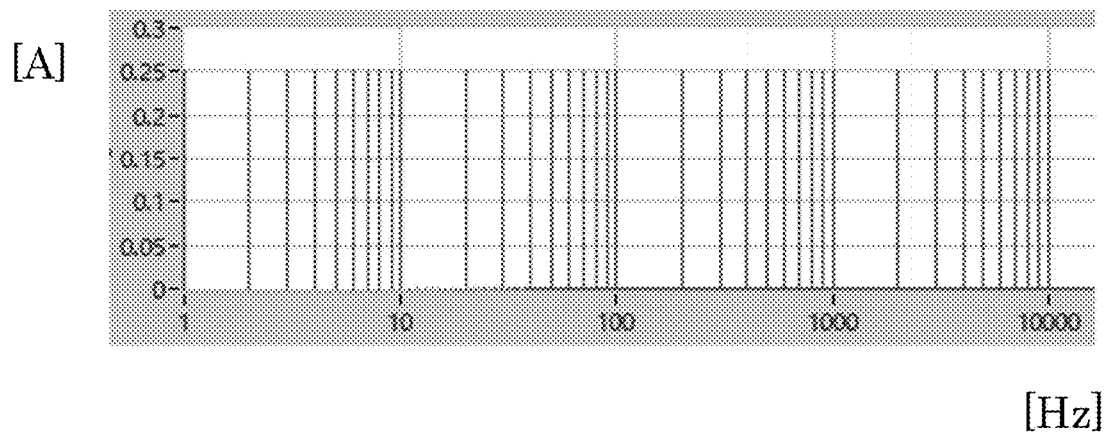
FIG. 8 is a schematic diagram illustrating an example of a secondary processing learning waveform calculated in a management method for a fuel cell.

As illustrated in FIG. 8 as an example, the control device 100 can use 1, 2, . . . , and 9 Hz (i.e., a total of 9 frequencies increased by 1 Hz from 1 to 9 Hz) corresponding to the frequency f1. The control device 100 can use 10, 20, . . . , and 90 Hz (i.e., a total of 9 frequencies increased by 10 Hz from 10 to 90 Hz) corresponding to the frequency f2. The control device 100 can use 100, 200, . . . , and 900 Hz (i.e., a total of 9 frequencies increased by 100 Hz from 100 to 900 Hz) corresponding to the frequency f3. The control device 100 can use 1 k, 2 k, . . . , and 9 kHz (i.e., a total of 9 frequencies increased by 1 kHz from 1 k to 9 kHz) corresponding to the frequency f4. The control device 100 can use 10 k, 20 k, . . . , and 90 kHz (i.e., a total of 9 frequencies increased by 10 kHz from 10 k to 90 kHz) corresponding to the frequency f5.

In this case, the maximum amplitude of the current in the secondary processing learning waveform is preferably about 5 A in absolute value, as an example, from the viewpoint of reducing an unnecessary load on the cell. From such a viewpoint, the amplitude value of the current at each frequency in the secondary processing learning waveform of the present embodiment is 0.25 A.

From the measurement value obtained based on this secondary processing learning waveform, the control device 100 calculates an impedance-frequency graph (third graph) and a phase difference-frequency graph (fourth graph). The third graph indicates a relationship between the impedance and the frequency illustrated in FIG. 9. The fourth graph indicates a relationship between the phase difference between the current and the voltage and the frequency illustrated in FIG. 10. For example, as clear from comparison between FIGS. 6 and 9, the number of frequencies used for measurement in the secondary processing learning waveform is larger than that in the primary processing learning waveform. Therefore, the control device 100 of the present embodiment measures the membrane resistance $R_{mem}$ of the cell based on the third graph and the fourth graph. In the present embodiment, the control device 100 can determine that the membrane resistance $R_{mem}$ is 40 mΩ from a minimum value K of the impedance-frequency graph illustrated in FIG. 9, for example.

The present embodiment is characterized by obtaining a measurement frequency (maximum measurement frequency) that is the maximum within a range where measurement accuracy can be ensued. That is, as clear from the Nyquist diagram described below, the frequency of the membrane resistance $R_{mem}$ is the maximum among the frequencies measured in the impedance of the cell. For this reason, in the present embodiment, the maximum measurement frequency is obtained in advance, and the frequency greater than this is not used for the deterioration determination because it has a small influence on the measurement accuracy. This can reduce the calculation load by the control device.

Figure 9:
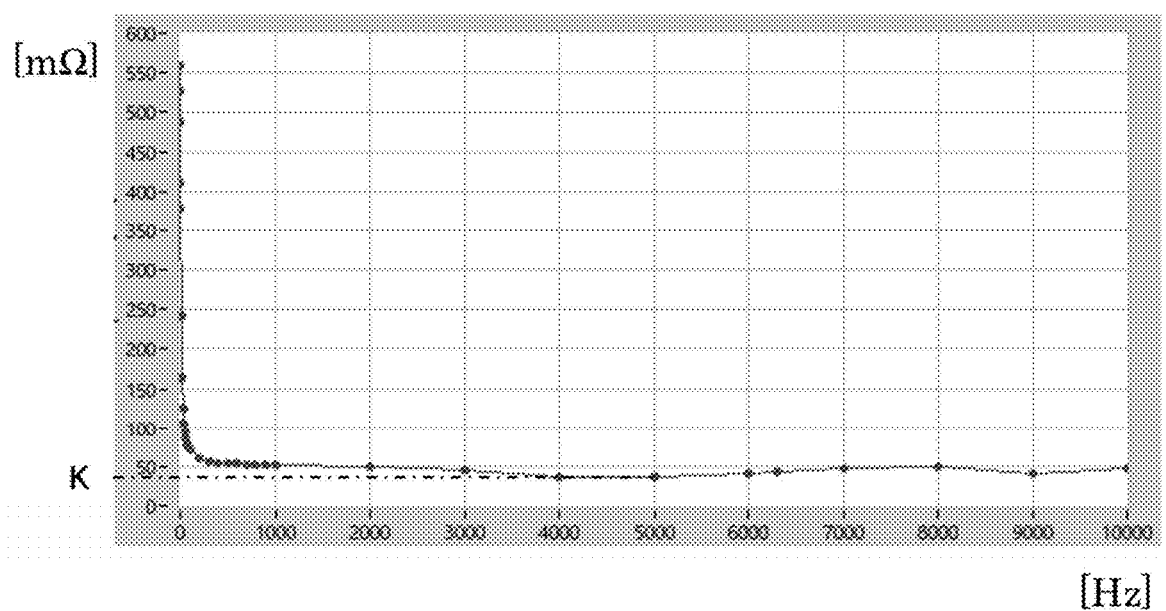
FIG. 9 is an example of a third graph illustrating a relationship between a frequency and an impedance used to acquire an initial value of membrane resistance $R_{mem}$ in a management method for a fuel cell.

Thus, in the present embodiment, the minimum value of the membrane resistance $R_{mem}$ in the cell is obtained using the frequency-impedance graph (third graph) illustrated in FIG. 9. When the secondary processing learning waveform is applied to the cell, plots come out by the above-described frequencies. Thus, the control device 100 creates a frequency-impedance graph based on the several points of plots. The control device 100 then determines the minimum value of the frequency-impedance graph as the membrane resistance $R_{mem}$ of the cell at the current time point.

Figure 10:
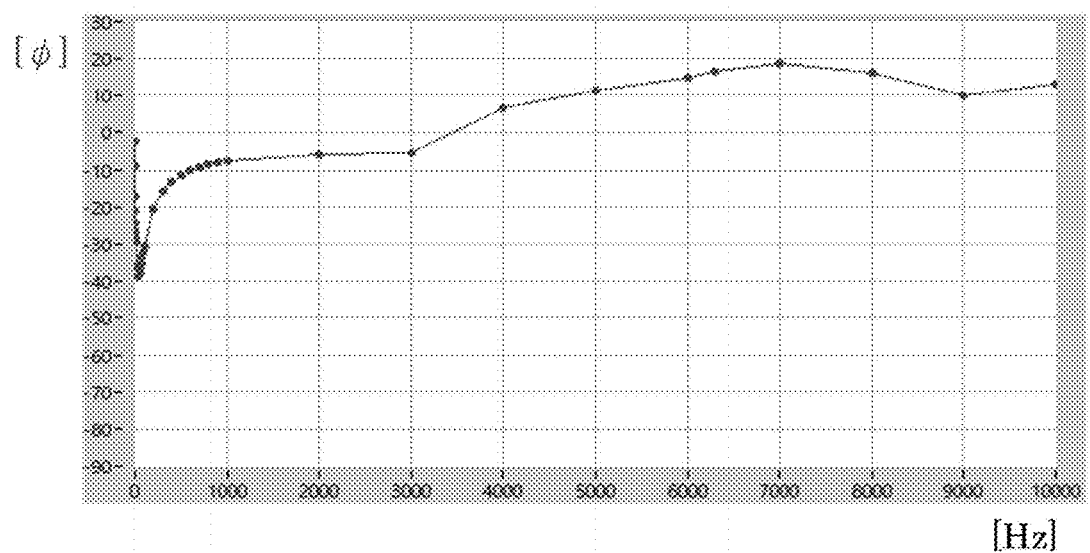
FIG. 10 is an example of a fourth graph defining a relationship between a phase difference and a frequency used in a measurement frequency search step in a management method for a fuel cell.

In the present embodiment, the upper limit of the measurement frequency used for deterioration determination of the cell is obtained using the phase difference-frequency graph (fourth graph) illustrated in FIG. 10. The control device 100 determines that the frequency at which the phase difference becomes zero (0) in the phase difference-frequency graph illustrated in FIG. 10 is the maximum measurement frequency. The control device 100 determines that the frequency equal to or higher than this maximum measurement frequency is not used for measurement.

Figure 11:
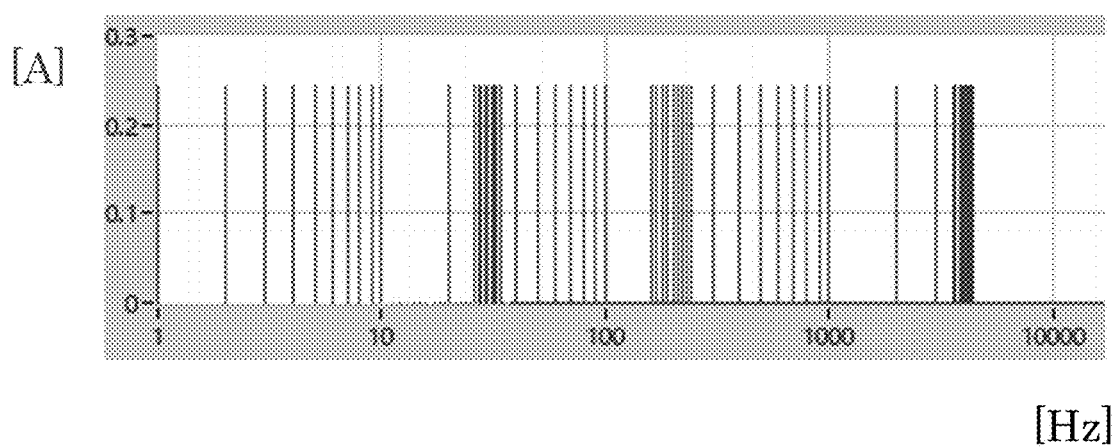
FIG. 11 is a schematic diagram illustrating an example of a measurement load waveform calculated in a management method for a fuel cell.
Figure 12:
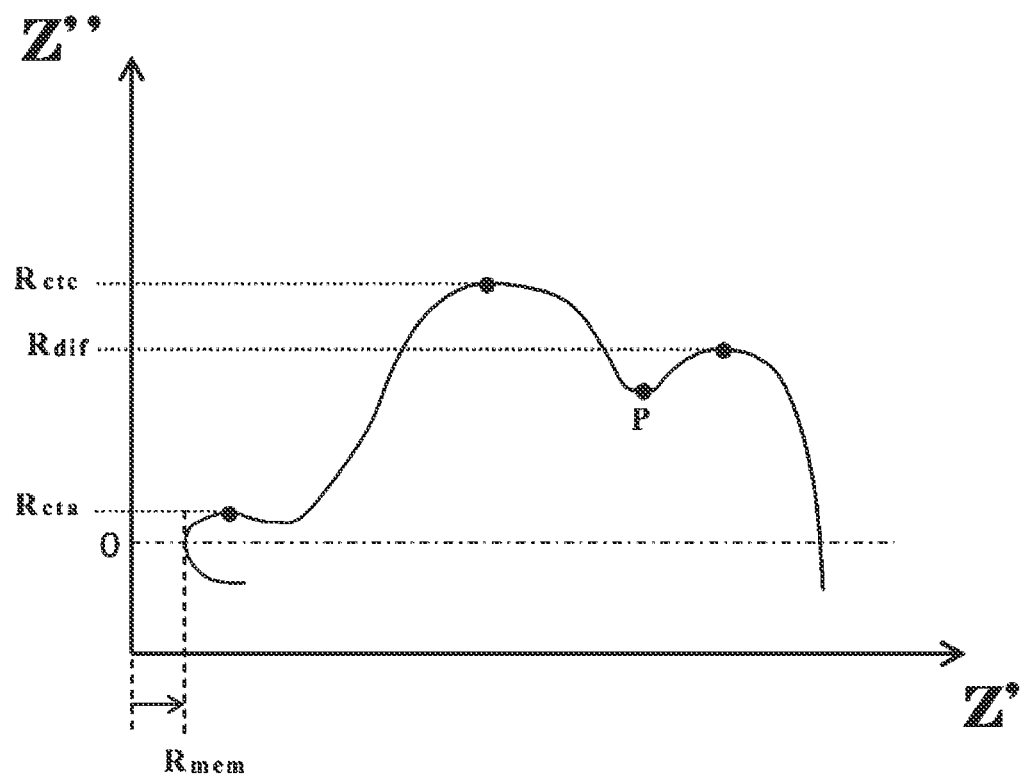
FIG. 12 is a schematic diagram illustrating an example of a Nyquist diagram (Cole-Cole plot) in a management method for a fuel cell.

After determining the initial value of the membrane resistance $R_{mem}$ and the maximum measurement frequency in the secondary processing, the control device 100 performs third processing (load waveform generation step). The third processing is of generating a measurement load waveform by using the frequencies of the membrane resistance $R_{mem}$, the charge transfer resistance $R_{ct}$, and the diffusion resistance $R_{dif}$ as reference frequencies and increasing the number of frequencies from the respective reference frequencies. In this case, the control device 100 may increase the number of measurement frequencies by equally dividing respective reference frequencies within the measurement time. As illustrated in FIG. 11 as an example, the control device 100 can use 4100, 4200, . . . , and 4900 Hz (i.e., a total of 9 frequencies increased by 100 Hz from 4100 to 4900 Hz) corresponding to the frequency (4500 Hz) of the membrane resistance $R_{mem}$. The control device 100 can use 610, 620, . . . , and 690 Hz (i.e., a total of 9 frequencies increased by 10 Hz from 610 to 690 Hz) corresponding to the frequency (650 Hz) of the charge transfer resistance $R_{ct}$. The control device 100 can use 1, 2, . . . , and 9 Hz (i.e., a total of 9 frequencies increased by 1 Hz from 1 to 9 Hz) corresponding to the frequency (5 Hz) of the diffusion resistance $R_{dif}$. In this case, the maximum amplitude of the current in the measurement load waveform is preferably about 5 A in absolute value, as an example, from the viewpoint of reducing an unnecessary load to the cell.

After the measurement load waveform is generated in Step 2B, the load waveform to be finally applied to the cell is determined in Step 3. That is, when the measurement load waveform is generated in Step 2B, it is determined to use this measurement load waveform as the load waveform in Step 3. On the other hand, when the process proceeds from Step 2A to Step 3, it is determined to use the load waveform used last time.

Subsequently, in Step 4, the control device 100 may perform offset processing on the measurement load waveform as necessary. For example, in a case where the width of the DC component applied to the fuel cell stack FC is narrower than the amplitude width of the current, the measurement accuracy cannot be ensured. Such a case includes a case where the current value of the fuel cell stack FC at the time of performing the deterioration determination is 0 A. For this reason, when the current value of the fuel cell stack FC is measured near 0 A, for example, the control device 100 may perform the processing of increasing the amplitude width of the current in the measurement load waveform.

On the other hand, for example, by defining the minimum current value of the fuel cell stack FC as start condition of the deterioration determination, Step 4 can be appropriately omitted.

In subsequent Step 5, the control device 100 measures and analyzes the deterioration determination using the measurement load waveform.

In one example, the control device 100 measures again the impedance obtained from the cell by superimposing the measurement load waveform obtained in Step 3 on the direct-current to be applied to the cell. Due to this, the control device 100 measures the membrane resistance $R_{mem}$, the charge transfer resistance $R_{ct}$, and the diffusion resistance $R_{dif}$ in the cell.

In one example, for the membrane resistance $R_{mem}$, the control device 100 calculates a real impedance value under predetermined condition (for example, a zero cross point at which the phase difference becomes 0 in the phase difference-frequency graph) in the relationship between the measurement frequency and the impedance. Instead of the above, the control device 100 may calculate the membrane resistance $R_{mem}$ in the cell based on the Nyquist diagram (Cole-Cole plot) illustrated in FIG. 12, for example.

On the other hand, the control device 100 can calculate an imaginary impedance value under another predetermined condition in the relationship between the measurement frequency and the impedance for the charge transfer resistance $R_{ct}$ and the diffusion resistance $R_{dif}$. Examples of the "another predetermined condition" include a point at which the slope in the Nyquist diagram (Cole-Cole plot) illustrated in FIG. 12 becomes negative. The control device 100 determines the values of the imaginary impedance at the points where the slope in the Nyquist diagram (Cole-Cole plot) illustrated in FIG. 12, for example, change from positive to negative as the charge transfer resistance $R_{ct}$ and the diffusion resistance $R_{dif}$. The control device 100 determines the point where the slope changes from negative to positive as an inflection point P. In general, the charge transfer resistance $R_{ct}$ is higher in frequency than the diffusion resistance $R_{dif}$. Therefore, the control device 100 can clearly distinguish between values of the charge transfer resistance $R_{ct}$ and the diffusion resistance $R_{dif}$ with reference to this inflection point P.

In the present embodiment, the imaginary impedance value is used as the reference value for the charge transfer resistance $R_{ct}$ and the diffusion resistance $R_{dif}$. However, the present embodiment is not limited to this form, and for example, the measured frequency may be used as the reference value.

When the membrane resistance $R_{mem}$, the charge transfer resistance $R_{ct}$, and the diffusion resistance $R_{dif}$ in the cell are measured in Step 5, the control device 100 performs processing of holding, into a storage device MD, the frequency of the measurement load waveform used for the measurement together with the current value of the fuel cell stack FC at the time of this measurement. This can hold, in the storage device MD, the frequency of the measurement load waveform corresponding to the current value applied to the fuel cell stack FC as a current map. Therefore, by measuring the current value of the fuel cell stack FC at the time of measuring the deterioration determination, the control device 100 can utilize, for the deterioration determination to be performed in the next and subsequent times, the frequency of the optimum measurement load waveform measured in the past according to the current value.

Figure 13:
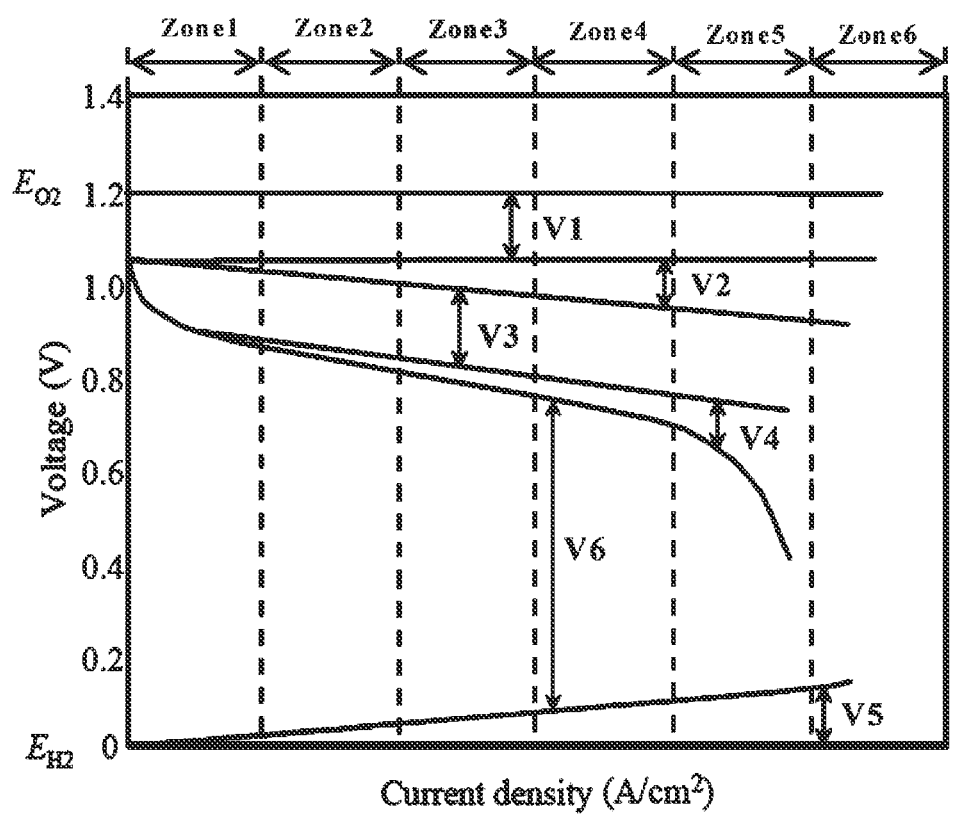
FIG. 13 is a schematic diagram illustrating a current value map (an example) used in a learning waveform generation step in a management method for a fuel cell.

An example of the current map is illustrated in FIG. 13. In FIG. 13, V1 represents known OCV overvoltage, V2 represents known resistance overvoltage, V3 represents known activation overvoltage, V4 represents known diffusion overvoltage, V5 represents known anode overvoltage, and V6 represents cell output voltage.

As understood from FIG. 13, in the present embodiment, the current value applied to the fuel cell stack FC is divided into zones. The frequencies of the measurement load waveform determined in Steps 2A, 2B, and 3 are held corresponding to respective zones. As an example, in the present embodiment, zones can be divided for every 10 A in the current map. In one example, for example, when the current value applied to the fuel cell stack FC is 35 A and the deterioration determination of the present embodiment is executed, frequency information of the measurement load waveform used for the measurement of this time is held in the storage device MD, an external server, or the like in association with a zone 4 to which 35 A belongs.

The frequency information of the measurement load waveform in each zone may be updated each time the deterioration determination is executed. Due to this, the frequency information of the latest measurement load waveform corresponding to the temporal change of the fuel cell stack FC is held corresponding to respective zones. In the present embodiment, the zone is divided for each 10 A. However the present embodiment is not limited to this mode, and the amperage divided according to the amperage that can be output by the fuel cell system may be adjusted.

The learning waveform has already been generated in and after Step 2B, for example. Therefore, the following processing can be executed in Step 3 after the waveform learning is determined not to be performed in Step 2A. The control device 100 can measure a current value of the fuel cell stack FC when executing the measurement of deterioration determination. The control device 100 can read the frequency information of the measurement load waveform corresponding to the current value of the fuel cell stack FC at the measurement of last time with reference to the current map held in the storage device MD or the like.

The current map may also be referred to when the learning waveform and the measurement load waveform are to be generated in Step 2B.

When the sum of the amplitude values of the currents exceeds a preset maximum amplitude (in this example, 5A in absolute value as described above) when the measurement load waveform is generated, the number of frequencies may be thinned out in the band of each of the frequencies f1 to f5. In this case, with reference to the current map, for measurement between the zones 1 to 3, for example, which is in general less likely to have the diffusion resistance $R_{dif}$, the number of frequencies at the frequency f4 and the frequency f5, which are bands with high frequencies, may be thinned out. In this manner, the control device 100 may execute processing of thinning out the number of frequencies in the measurement load waveform based on the current value of the fuel cell stack FC at the time of measurement with reference to the current map. This makes it possible to further reduce the load of processing by the control device without significantly reducing the accuracy of measurement.

Figure 14:
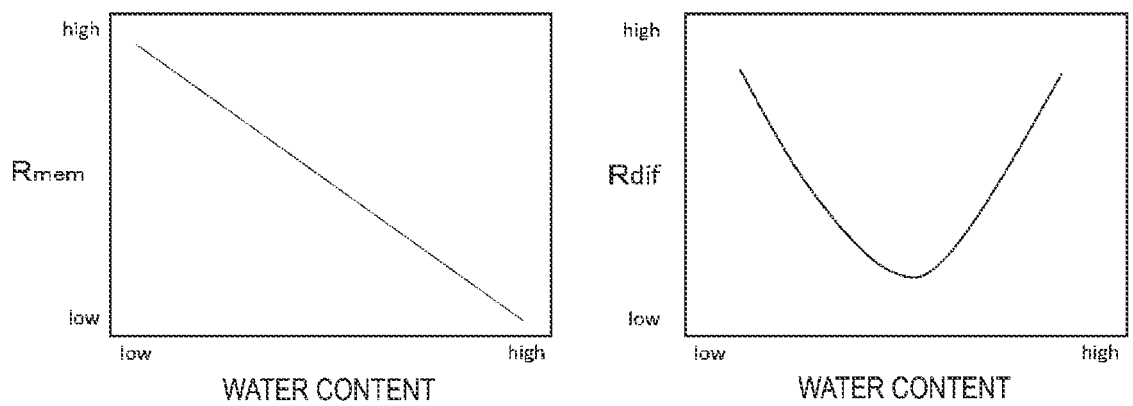
FIG. 14 is a schematic diagram illustrating a water content determination map (an example) used in a state determination step in a management method for a fuel cell.

After the membrane resistance $R_{mem}$, the charge transfer resistance $R_{ct}$, and the diffusion resistance $R_{dif}$ of the cell at the measurement time point are calculated by the above processing, the control device 100 analyzes the water content state in the cell. In one example, the control device 100 can analyze the water content state in the cell based on a relationship between the membrane resistance $R_{mem}$ and the water content and a relationship between the diffusion resistance $R_{dif}$ and the water content that are illustrated in FIG. 14.

In Step 5, the control device 100 compares the acquired parameter (the membrane resistance $R_{mem}$ and the diffusion resistance $R_{dif}$) values in the cell calculated last time with the newly acquired parameter (the membrane resistance $R_{mem}$ and the diffusion resistance $R_{dif}$) values calculated this time. As a result of the comparison described above, the control device 100 calculates how the newly acquired parameter is changed (transitioned) relative to the acquired parameter.

With reference to reference table data illustrated in FIG. 15 where transition prediction of the water content corresponding to each transition of the membrane resistance and the diffusion resistance is prescribed, the control device 100 executes water content adjustment processing of the cell presented below. Such reference table data may be held in the storage device MD, an external server outside the vehicle, or the like. As illustrated in FIG. 15, (a) when the membrane resistance $R_{mem}$ increases and the diffusion resistance $R_{dif}$ also increases, the control device 100 analyzes in Step 5 that a dry tendency is strong and executes wetting treatment on the cell by a known method in subsequent Step 6. (b) When the membrane resistance $R_{mem}$ decreases and the diffusion resistance $R_{dif}$ increases, the control device 100 analyzes that a wet tendency is strong and executes drying treatment on the cell by a known method in the subsequent Step 6. (c) When the membrane resistance $R_{mem}$ increases and the diffusion resistance $R_{dif}$ decreases, the control device 100 analyzes that the cell is in a wet tendency and intermittently executes drying treatment on the cell by a known method in the subsequent Step 6. (d) When the membrane resistance $R_{mem}$ decreases and the diffusion resistance $R_{dif}$ also decreases, the control device 100 analyzes that the cell is in a dry tendency and intermittently executes wetting treatment on the cell by a known method in the subsequent Step 6.

After performing the water content adjustment on the cell of the fuel cell stack FC in Step 6, the control device 100 executes deterioration diagnosis processing of the fuel cell stack FC in subsequent Step 7. In Step 7, the control device 100 measures the current value and the voltage value of the fuel cell stack FC by the current sensor SR1 and the voltage sensor SR2, for example. The control device 100 then determines whether the voltage of the fuel cell stack FC becomes equal to or less than the threshold (for example, a case where a IV characteristic of the cell is measured in advance, and the IV characteristic of the cell at a deterioration determination time point of this time falls below a predetermined reference range) even after the water content adjustment of the cell in Step 6.

Upon determining in Step 8A that deterioration occurs in the fuel cell stack FC, the control device 100 executes in subsequent Step 8B warning processing to the user such as the driver. In the warning processing, the control device 100 may execute processing according to the level of deterioration described above.

When the deterioration level is "1", the control device 100 may perform processing of the reminder to, for example, the user via the presentation device DD. For example, when the deterioration level is "2", the control device 100 may execute the presentation processing of maintenance recommendation to the user via the presentation device DD, for example. For example, when the deterioration level is "3", the control device 100 may restrict the output of the vehicle via the drive controller 30 or may execute the guide processing for the user via the presentation device DD. Thus, the control device 100 according to the present embodiment can perform processing according to the deterioration level of the fuel cell stack FC based on the degree of voltage drop with reference to the threshold.

The control device 100 including the state determination device 10 of the present embodiment described above can perform processing of feeding back the measurement result of the impedance in a cell measured in past and varying the frequency and the amplitude of the measurement load waveform to be measured this time. Due to this, even when a change occurs in the state of the cell, it is possible to maintain the accuracy of measurement including deterioration determination while reducing the load of calculation.

Although the preferred embodiment of the present disclosure has been described in detail with reference to the accompanying drawings, the technology of the present disclosure is not limited to such examples. It is obvious that a person having ordinary knowledge in the technical field to which the present disclosure belongs can conceive various changes or modifications within the scope of the technical idea described in the claims, and it is naturally understood that these also belong to the technical scope of the present disclosure.

According to the present disclosure, it is possible to reduce an arithmetic load and accurately measure an internal state of a fuel cell in a short time.

The invention claimed is:

1. A state determination device for a fuel cell stack, the state determination device comprising:
   a fuel cell stack comprising one or more cells; and
   a control device configured to perform a state determination of the fuel cell stack by applying a measurement load waveform to the one or more cells,
   wherein the control device is configured to
   generate a learning waveform by referring to a result of measurement by applying a primary processing learning waveform to the one or more cells and a result of measurement by applying a secondary processing learning waveform to the one or more cells, the primary processing learning waveform comprising frequencies with different numbers of digits and being configured to primarily grasp membrane resistance of the one or more cells, the secondary processing learning waveform comprising frequencies generated by increasing a number of the frequencies used for the measurement with the primary processing learning waveform and configured to secondarily grasp the membrane resistance,
   generate the measurement load waveform to be used this time by using, as reference values, the membrane resistance, charge transfer resistance, and diffusion resistance in a relationship between a measurement frequency and an impedance that are generated based on the learning waveform,
   apply, to the one or more cells, a waveform with an amplitude and frequencies that are calculated based on the measurement load waveform, and
   perform the state determination by measuring an alternating-current impedance by discharging, from the one or more cells, a current or a voltage corresponding to a frequency of the measurement load waveform.

2. The state determination device for a fuel cell stack according to claim 1,
   wherein the control device is configured to
   perform determination of a water content state of the fuel cell stack by calculating a difference between the measurement of last time and the measurement of this time using the membrane resistance, the charge transfer resistance, and the diffusion resistance,
   use, for the membrane resistance, a real impedance value at a zero cross point in the relationship between the measurement frequency and the impedance as a reference value, and
   use, for each of the charge transfer resistance and the diffusion resistance, an imaginary impedance value at a point where a slope in the relationship between the measurement frequency and the impedance becomes negative as the reference value.

3. The state determination device for a fuel cell stack according to claim 2,
   wherein the control device is configured to
   determine that deterioration has occurred in the fuel cell stack when the voltage becomes equal to or less than a threshold even after water management optimization processing executed based on the determination of the water content state.

4. The state determination device for a fuel cell stack according to claim 3,
   wherein the control device is configured to
   perform processing according to a deterioration level of the fuel cell stack based on a degree of drop in the voltage with reference to the threshold.

5. A state determination device for a fuel cell stack, the state determination device comprising:
   a fuel cell stack comprising one or more cells; and
   circuitry configured to perform a state determination of the fuel cell stack by applying a measurement load waveform to the one or more cells,
   wherein the circuitry is configured to
   generate a learning waveform by referring to a result of measurement by applying a primary processing learning waveform to the one or more cells and a result of measurement by applying a secondary processing learning waveform to the one or more cells, the primary processing learning waveform comprising frequencies with different numbers of digits and being configured to primarily grasp membrane resistance of the one or more cells, the secondary processing learning waveform comprising frequencies generated by increasing a number of the frequencies used for the measurement with the primary processing learning waveform and configured to secondarily grasp the membrane resistance,
   generate the measurement load waveform to be used this time by using, as reference values, the membrane resistance, charge transfer resistance, and diffusion resistance in a relationship between a measurement frequency and an impedance that are generated based on the learning waveform,
   apply, to the one or more cells, a waveform with an amplitude and frequencies that are calculated based on the measurement load waveform, and
   perform the state determination by measuring an alternating-current impedance by discharging, from the one or more cells, a current or a voltage corresponding to a frequency of the measurement load waveform.

\* \* \* \* \*